(12) United States Patent
Fast

(10) Patent No.: US 7,544,030 B2
(45) Date of Patent: Jun. 9, 2009

(54) ATV BALL-HITCH CONNECTED HAY BALE SPIKE AND HAY BALE SUSPENSION SYSTEM

(75) Inventor: Lonnie B. Fast, Fairmont, WV (US)

(73) Assignee: Fast Hay Movers, Inc., Fairmont, WV (US)

( * ) Notice: Subject to any disclaimer, the term of this patent is extended or adjusted under 35 U.S.C. 154(b) by 196 days.

(21) Appl. No.: 11/422,501

(22) Filed: Jun. 6, 2006

(65) Prior Publication Data

US 2007/0278272 A1 Dec. 6, 2007

(51) Int. Cl.
*A01D 85/00* (2006.01)
*B60D 1/07* (2006.01)

(52) U.S. Cl. ................ 414/24.5; 414/462; 414/911; 280/416.1

(58) Field of Classification Search ........... 414/24.5, 414/24.6, 111, 546, 555, 911, 462; 280/416.1, 280/402, 416.2; 172/439; 224/519, 520
See application file for complete search history.

(56) References Cited

U.S. PATENT DOCUMENTS

| 4,023,693 | A | | 5/1977 | Priefert | |
|---|---|---|---|---|---|
| 4,126,234 | A | * | 11/1978 | Wells | 414/24.5 |
| 4,237,821 | A | * | 12/1980 | Haines | 119/60 |
| 4,348,143 | A | | 9/1982 | Hedgespeth | |
| 4,527,935 | A | | 7/1985 | Fortenberry | |
| 4,683,970 | A | | 8/1987 | Smith | |
| 5,211,601 | A | * | 5/1993 | Cope | 452/187 |
| 5,230,526 | A | | 7/1993 | Jolivet | |
| 5,513,868 | A | | 5/1996 | Barr | |
| 5,556,245 | A | * | 9/1996 | Moss | 414/24.5 |
| 5,645,292 | A | | 7/1997 | McWilliams | |
| 5,807,053 | A | | 9/1998 | Pride | |
| 5,911,556 | A | | 6/1999 | Caldwell | |
| 5,954,468 | A | | 9/1999 | Marshall | |
| 5,964,565 | A | | 10/1999 | Skotzky | |
| 6,254,117 | B1 | | 7/2001 | Cross | |
| 6,286,854 | B1 | | 9/2001 | Cross | |
| 6,305,894 | B1 | | 10/2001 | Dearborn | |
| 6,312,210 | B1 | * | 11/2001 | Lang | 414/540 |
| 6,378,904 | B1 | | 4/2002 | Niehoff | |
| 6,461,095 | B1 | * | 10/2002 | Puska | 414/462 |
| 6,607,345 | B2 | | 8/2003 | McElhany | |
| 6,609,481 | B1 | | 8/2003 | McCarty | |
| 6,612,380 | B2 | * | 9/2003 | Pyle | 172/439 |
| 6,612,549 | B1 | | 9/2003 | Woods | |
| 6,732,892 | B1 | * | 5/2004 | Mangrum | 224/401 |

(Continued)

FOREIGN PATENT DOCUMENTS

| GB | 2250005 | 5/1992 |
|---|---|---|
| GB | 2364972 | 2/2002 |

*Primary Examiner*—Gregory W Adams
(74) *Attorney, Agent, or Firm*—Dinsmore & Shohl LLP

(57) ABSTRACT

The present invention relates to a hitching apparatus for use with a vehicle that facilitates the coupling of equipment to a vehicle in a non-hinged manner so as to inhibit the lateral pivot of the equipment in relation to the vehicle. The present invention further relates to a novel hay bale suspension system that may be coupled to a vehicle through the hitching apparatus of the present invention and used to support and enable transportation of a round hay bale.

13 Claims, 10 Drawing Sheets

U.S. PATENT DOCUMENTS

| | | |
|---|---|---|
| 6,840,730 B2 | 1/2005 | Noualy |
| 6,869,265 B2 | 3/2005 | Smith et al. |
| 2001/0041116 A1 | 11/2001 | Noualy |
| 2003/0223847 A1 | 12/2003 | Crider |
| 2005/0008461 A1 | 1/2005 | Hedrich |
| 2005/0254925 A1 | 11/2005 | Braquet |

* cited by examiner

ATV BALL-HITCH CONNECTED HAY BALE SPIKE AND HAY BALE SUSPENSION SYSTEM

The present invention relates to a hitching apparatus for use with vehicles, and a hay bale suspension system, for use with a vehicle to transport bales of hay.

Equipment is typically hitched to a vehicle (such as, but not limited to, an all-terrain vehicle (ATV)) by means of a standard trailer-hitch, the combination of which (the tow vehicle and trailer or equipment) form an articulated (hinged) vehicle. This type of hitch presents loss-of-control concerns when traveling over uneven terrain or transporting heavy loads, as the trailer or equipment pivots in association with the rotation of the vehicle and, depending on the load, may tip or otherwise cause the vehicle to lose control or jack-knife. Maneuvering in reverse is also difficult with the standard trailer-hitch connection between the vehicle and the equipment. Therefore, there is a need in the art to hitch equipment to a vehicle in a non-hinged manner such that the loss of control concerns are eliminated or substantially precluded. The hitching apparatus of the present invention satisfies this need. This hitching apparatus is particularly useful in coupling a hay bale suspension system to a vehicle in a non-hinged manner such that a hay bale may be suspended and transported.

The following description of the present inventions and certain embodiments thereof can be best understood when read in conjunction with the following drawings, where like structure is indicated with like reference numerals and in which.

Referring to the figures, the present invention relates to a hitching apparatus 50 for use with a vehicle 1 that facilitates the coupling of equipment to a vehicle in a non-hinged manner so as to inhibit the lateral pivot of the equipment in relation to the vehicle. The present invention further relates to a novel hay bale suspension system 10 that may be coupled to a vehicle 1 through the hitching apparatus 50 of the present invention and used to support and enable transportation of, what is preferably, a round hay bale 100.

Figure 1:
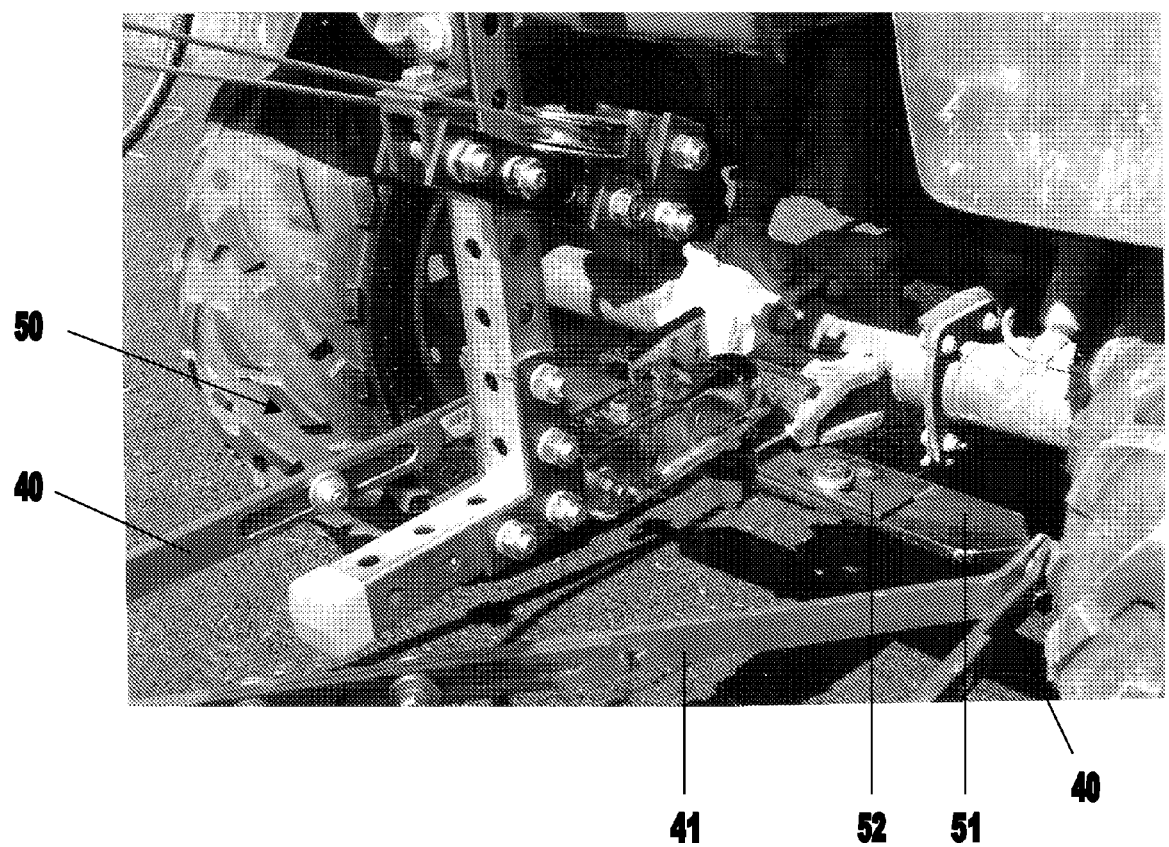
FIG. 1 is an illustration of an embodiment of a hitching apparatus of the present invention and a portion of a pulley system for a hay bale suspension system.

The hitching apparatus 50 generally comprises a hitch bar 51, means to secure the same to the rear of a vehicle 1, and means by which equipment can be coupled to the hitch bar 51, and thereby vehicle 1, in a non-hinged manner. As shown in FIG. 1, the hitch bar 51 is configured sufficiently long to stably support connecting arms 40 of the coupling means in parallel form, as hereinafter described, but short enough so that when used in conjunction with the connecting arms 40, neither the arms 40 nor the hitch bar 51 interferes with the operation of the remainder of the vehicle 1 (e.g., the wheels or suspension system).

Figure 2:
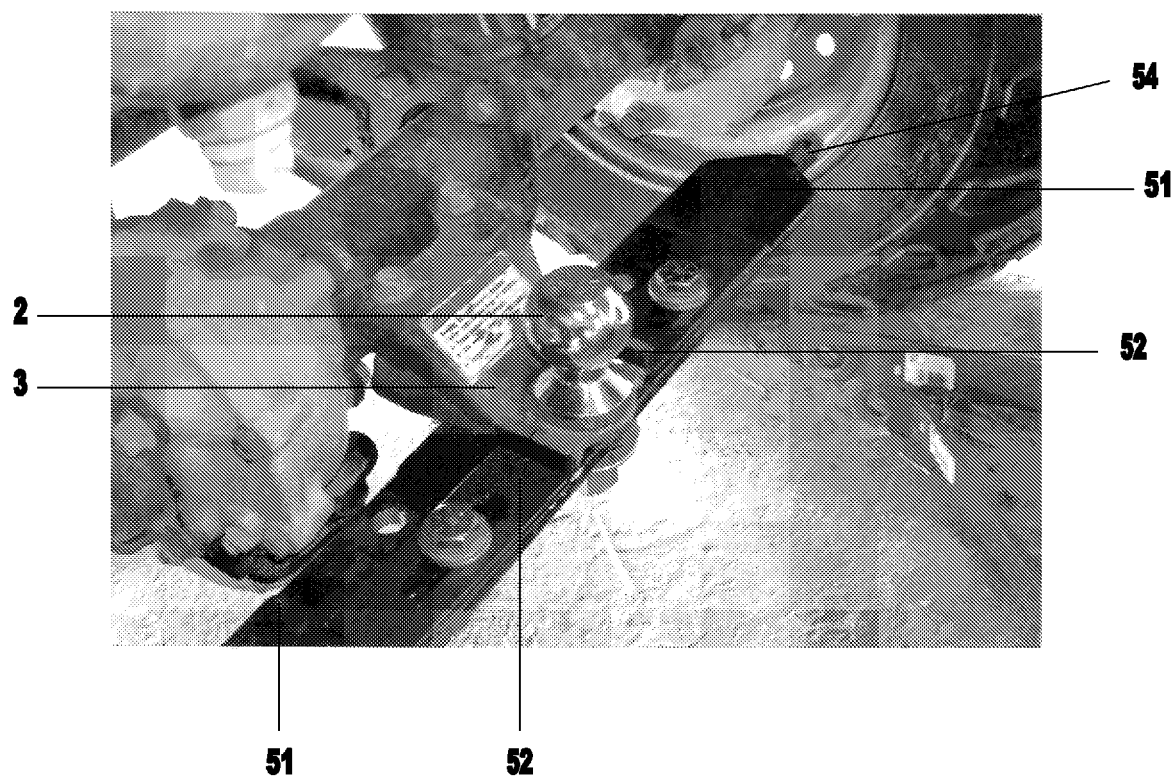
FIG. 2 is an illustration of an embodiment of a hitching apparatus of the present invention where a hitch bar is secured to a vehicle by a ball hitch and bar clamps.

As shown in FIG. 2, this hitch bar 51 may be secured to a vehicle 1 by means of one or more apertures there-through, said apertures being sized to receive the bolt of a ball hitch, preferably under the bottom plate 3 of the ball hitch. The securing means may also comprise bar clamps 52, positioned on the hitch bar 51 to butt up against the sides of the hitching extension bottom plate 3, so as to further stabilize the coupling of the hitch bar 51 to the ball hitch 2 and inhibit the lateral pivot of the hitch bar 51 about the ball hitch bolt. These bar clamps 52 may be adjustably secured to the hitch bar 51 by means of bolts and apertures or bolt slots through the bar clamps.

Figure 3:
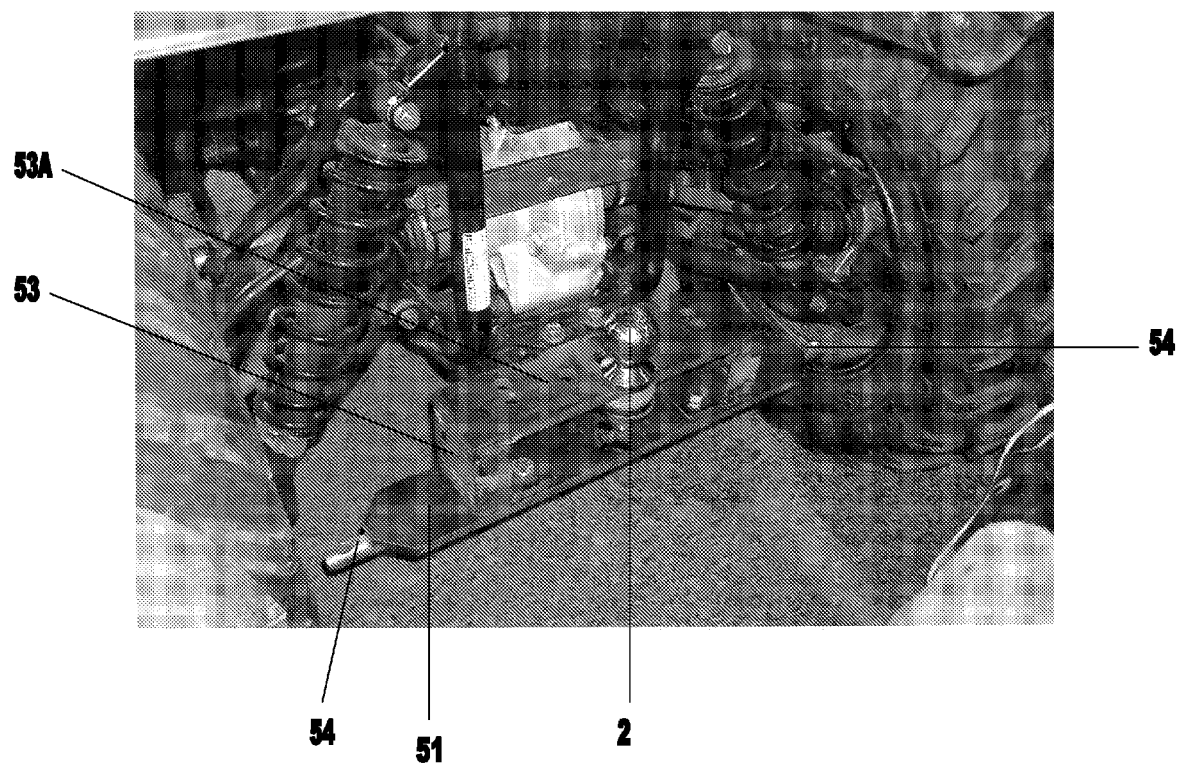
FIG. 3 is an illustration of an embodiment of a hitching apparatus of the present invention where a hitch bar is secured to a vehicle with an extension block.

As depicted in FIG. 3, the means to secure the hitch bar 51 to the vehicle 1 may further comprise an extension block 53 when the ball hitch 2 of the vehicle 1 is higher off of the ground than desired (which may cause instability in the transport of heavier matters, such as a hay bale 100 or heavy equipment). In this embodiment, the extension block 53 is affixed to the top of the hitch bar 51 by welding, nuts and bolts securing the components together in corresponding apertures, or otherwise. When an extension block 53 is used with the hitching apparatus 50, an aperture on the top plate 53A of the block 53 receives the bolt of the ball hitch 2, and bar clamps 52 may be positioned on said top plate 53A to butt up against the sides of the hitching extension bottom plate 3. Therefore, the use of the extension block 53 lowers the position of the hitch bar 51 in relation to the vehicle 1 such that the connecting arms may maintain a substantially horizontal orientation when coupling equipment to the hitch bar 51.

Further, the hitch bar 51 may comprise at least one pin 54, shown in FIGS. 1 and 3, that is secured to and extends from each end of the hitch bar 51. This pin (or pins) 54 is configured to receive the connecting arms 40 through apertures in the terminal ends of the connecting arms 40. Exposed ends of this pin (or pins) 54 may have apertures therein to receive a clevis pin, a bolt and nut system, or other similar means to secure a connecting arm 40 to a pin 54.

Equipment, such as the hay bale suspension system 10 of the present invention, may be coupled to the hitch bar 51, and, thus, to the vehicle 1, through coupling means comprising two or more connecting arms 40. These connecting arms 40 may be straight or have some corresponding curvature and, through the terminal end apertures, may be coupled to the extending pin or pins 54 of the hitch bar 51. When coupled to the extending pin or pins 54, the connecting arms 40 are generally parallel to each other, with sufficient distance existing between them to maintain the non-hinged coupling of the equipment to the vehicle 1. Further, the connecting arms 40 preferably are coupled to the hitch bar 51 in a manner so as to maintain a substantially horizontal orientation.

Referring back to FIG. 1, the coupling means may further comprise one or more restrictive arms 41 that may be placed perpendicularly or diagonally from or near one connecting arm 40 to the other. Similar to the connecting arms 40, the restrictive arm 41 may have apertures at each terminal end to allow the affixation of the restrictive arm 41 to a pin 54 of the hitch bar 51. The restrictive arm 41, however, may be otherwise coupled to the connecting arms 40, the hitch bar 51, and the equipment, or any combination thereof, with the purpose of restricting the connecting arms 40 to a parallel formation. Thereby, the restrictive arm 41 aids in inhibiting the lateral pivot of the equipment in relation to the vehicle 1.

In some embodiments, one or more of the arms 40, 41 may comprise two or more partially overlapping bars having bolt apertures and/or slots configured to allow the lengths of such arms 40, 41 to be adjusted as may be necessary or desirable. Bushings may be used between the connecting arms 40 and the restrictive arm 41, for example on the pin 54 or rod 25, to prevent excessive wear and tear and to tighten the connectivity thereof.

Figure 4:
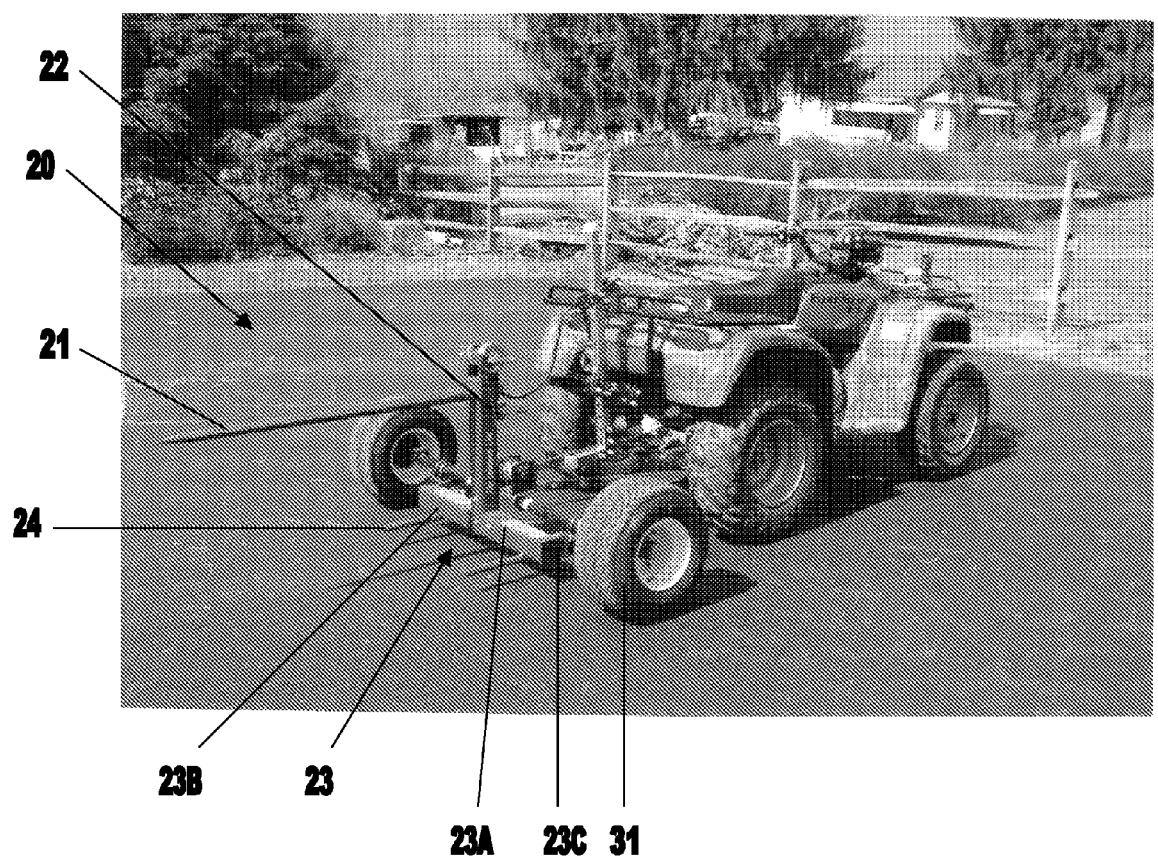
FIGS. 4 and 5 are illustrations of an embodiment of a hay bale suspension system of the present invention coupled to a vehicle.
Figure 5:
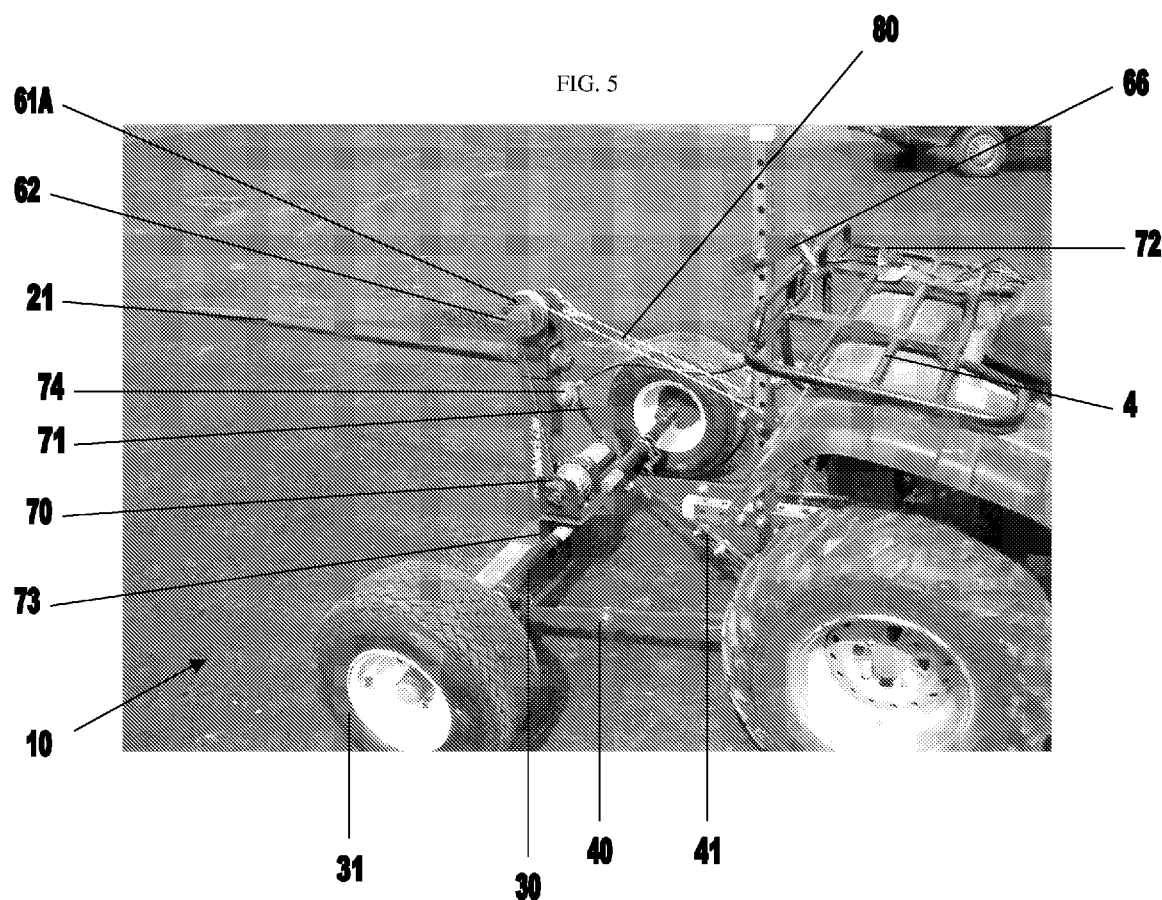
Figure 10:
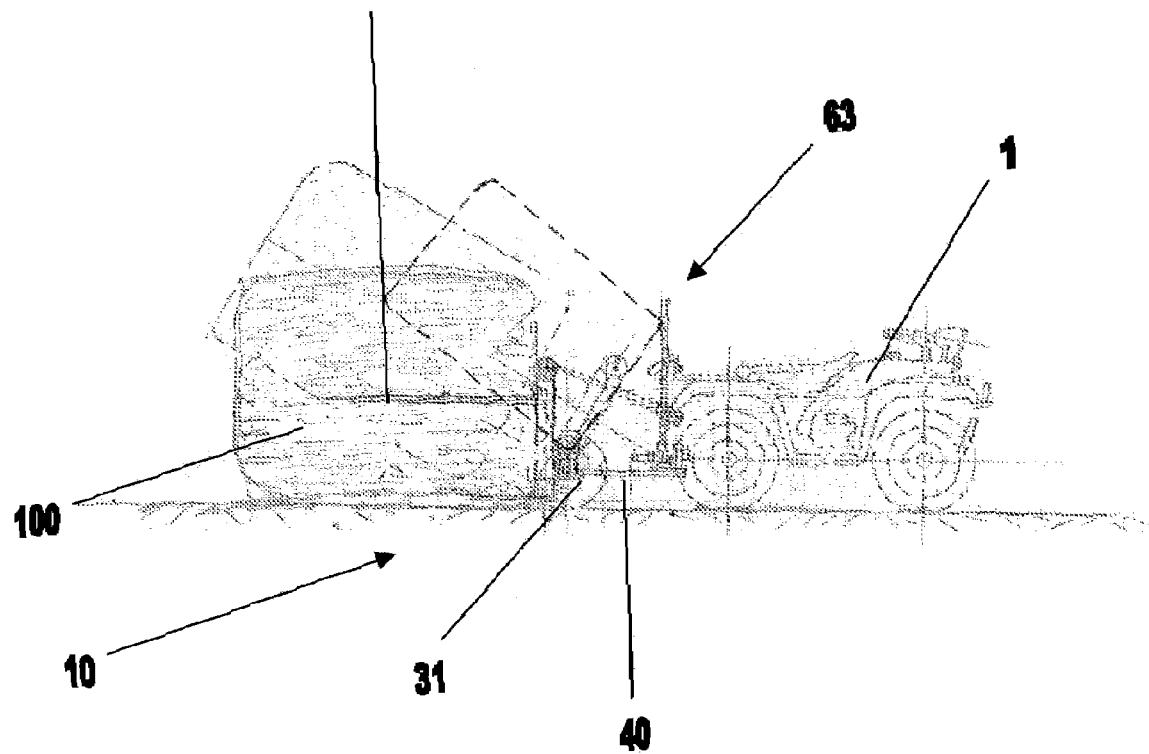
FIG. 10 is an illustration of an embodiment of a hitching apparatus and a hay bale suspension system of the present invention applied to an all-terrain vehicle.

The hay bale suspension system 10, one embodiment of which is shown in FIGS. 4, 5, and 10, that may be coupled to the hitching apparatus 50, and, thus, to a vehicle 1, preferably comprises a hay spear system 20 and a pulley system 60. The hay spear system 20 is configured to support a hay bale 100 during transport thereof. The pulley system 60 is configured to tilt the hay spear system 20 such that the pierced hay bale 100 can be suspended above a ground surface at an angle ranging from more than 1 degree to less than 90 degrees, although preferably between about 30 and 50 degrees, as shown in FIG. 10.

As shown in FIGS. 4 and 5, the hay spear system 20 of the present invention generally comprises at least one spike 21, a vertical support 22, and the base support 23. The vertical support 22 is affixed to and extends upwardly from the base support 23, at or near the center thereof. The spike 21 is affixed to, and extends perpendicularly from, the vertical support 22. This spike 21 is positioned such that when it is in loading position (as hereinafter described), it can be used to pierce and travel along a cylindrical axis of a hay bale 100. The base support 23 may comprise one or more support posts 24 projecting from the exterior face 23B thereof, positioned on the base support 23 to support the bottom surface of a hay bale 100. The base support 23 may further comprise base plates 24 that extend from its terminal sides 23C. Rods 25 may extend through apertures in the base plates 24 that may couple the hay spear system 20 to the connecting arms 40 and, in some embodiments, the restrictive arm 41, by passing through terminal apertures of the arms 41, 42. It should be noted that the hay spear system may be coupled to the connecting arms by coupling means other than the rods 25. Readily available hay spear systems that are suitable for use in the present invention include (but are not limited to) a 3-point bale spear manufactured by Leinbach Machinery Company. While this embodiment has been described, other configurations of hay spear systems, varying from the description above, may be used in accordance with the present invention.

Figure 6:
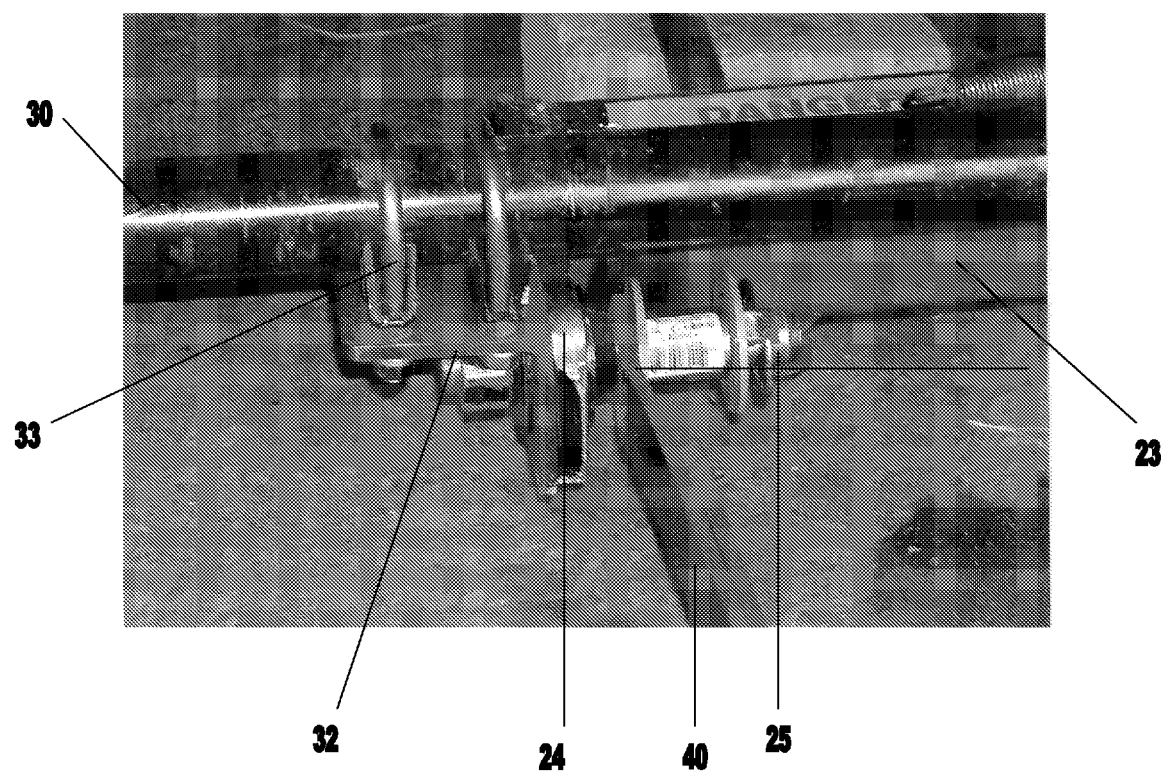
FIG. 6 is an illustration of an embodiment of the engagement of a base support of a hay spear system, an axle, and the coupling means of the present invention.

As shown in FIG. 6, the hay spear system 20 further comprises an axle 30 coupled to the base support 23. The axle 30 may be secured to the base support 23 by means of the base plates 24, using L-shaped brackets 32 having an aperture there-through configured to receive a rod 25 of the hay spear system 20, and one or more muffler clamps 33. These muffler clamps 33 can be secured around the axle 30 and extend through additional apertures on the top face of the L-shaped brackets 32. The brackets 32 and clamps 33 may be secured to the hay spear system 20 as described above by means of bolts, nuts and/or washers. While this embodiment has been described, other means to secure the axle 30 to the base support 23 may be used. The wheels 31 may then be secured to the ends of this axle 30 by means such as 4 or 5 lug hubs or other similar means. The length of axle 30 is preferably configured in size to form a more stable suspension of the hay bale suspension system 10. In addition, the hay bale suspension system 10 is configured such that the axle 30 and wheels 31 primarily bear the weight of a suspended hay bale 100. This configuration of the hay bale suspension system 10 ensures that the ball hitch 2 and a rack 4, if connected to the system 10, of a vehicle 1 are not overloaded with the weight of a suspended hay bale 100 and prevents any undue stress both on these points of connection between the system 10 and the vehicle 1 and on the vehicle 1 itself.

Generally, the pulley system 60, an embodiment of which is shown in FIG. 5, comprises two pulleys 61A, 61B, a winch 70, and a cable 80, and is configured such that a winding or unwinding of the cable 80 by the winch 70 adjusts the tilt of the hay spear system 20. One of these pulleys 61A may be mounted to a top end of the vertical support 22 of the hay spear system 20. This pulley 61A may be provided with a pulley protection assembly 62 that is configured to protect the rotation of the pulley 61A and the winding or unwinding of the cable 80 about this pulley 61A from interference from a pierced hay bale 100 tilted by the hay spear system 20. Meanwhile, the second pulley 61B provides additional support to the hay spear system 20 by applying a lateral opposition pull against the vehicle 1, with little dependence on the countervailing weight of the vehicle 1. Thus, the strength of the pulley system 60 is applied to the weight of the hay bale 100 as the pulley system 60 tilts the pierced hay bale 100 off of the ground surface. The configuration and placement of the second pulley 61B, however, may depend on the suspension system of the vehicle 1.

Figure 7:
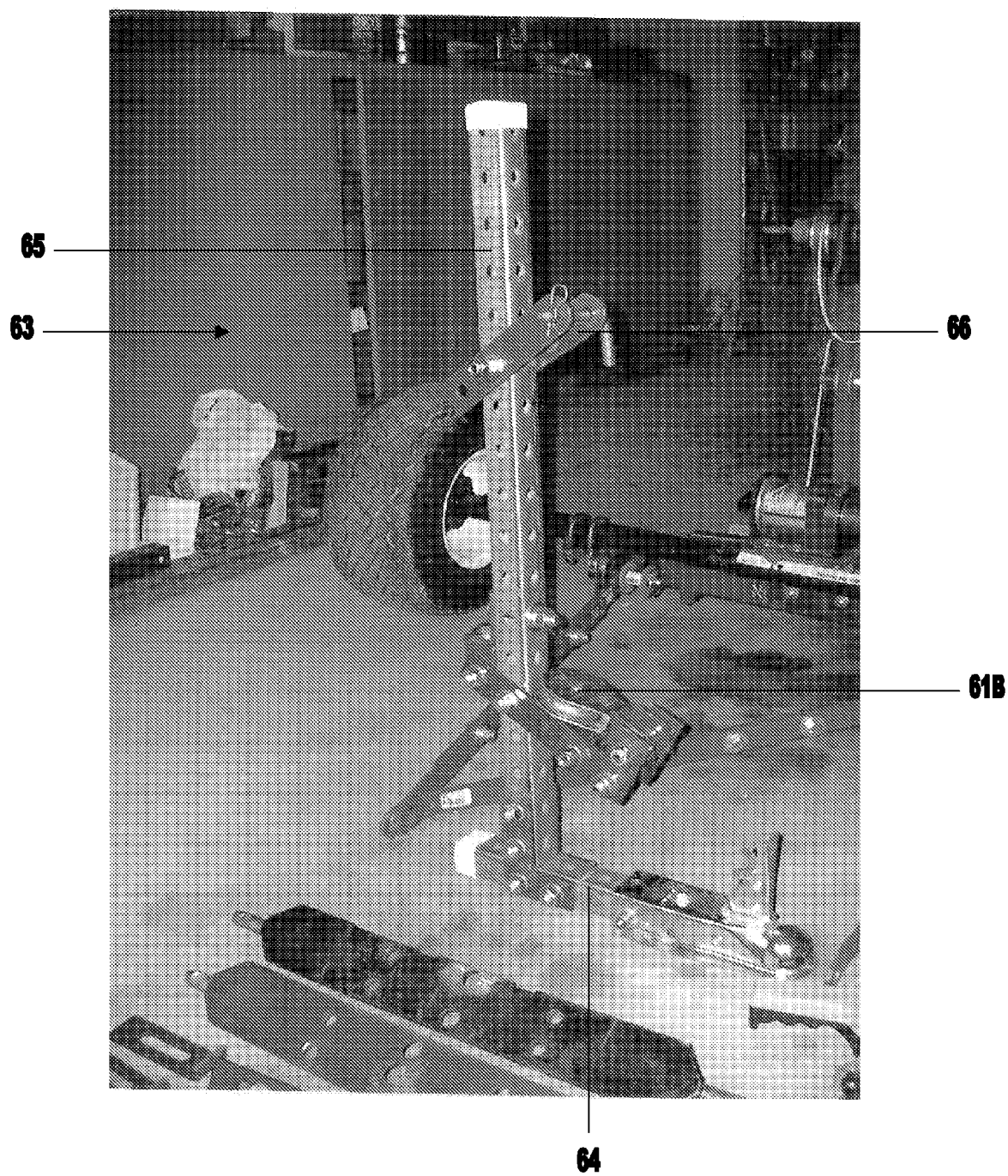
FIG. 7 is an illustration of an embodiment of the vertical post system of the present invention.

For a vehicle having a straight axle suspension system, the pulley system 60 further comprises a vertical post system 63, an embodiment of which shown in FIG. 7. This vertical post system 63 may comprise a vertical post 65 and means to secure said post 65 to the system 63. The second pulley 61B may be affixed to this vertical post 65 through the use of brackets, nuts, and bolts, or other similar components. As shown in FIG. 7, the vertical post system 63 may be configured to secure to the ball hitch 2 of the vehicle 1 and to a rack 4 or to the top rear surface of the vehicle 1. Securing the vertical post system 63 to two areas of the vehicle 1 provides greater stability to the hay bale suspension system 10 that may be desirable when the system 10 is applied to straight axle suspension vehicles.

Figure 8:
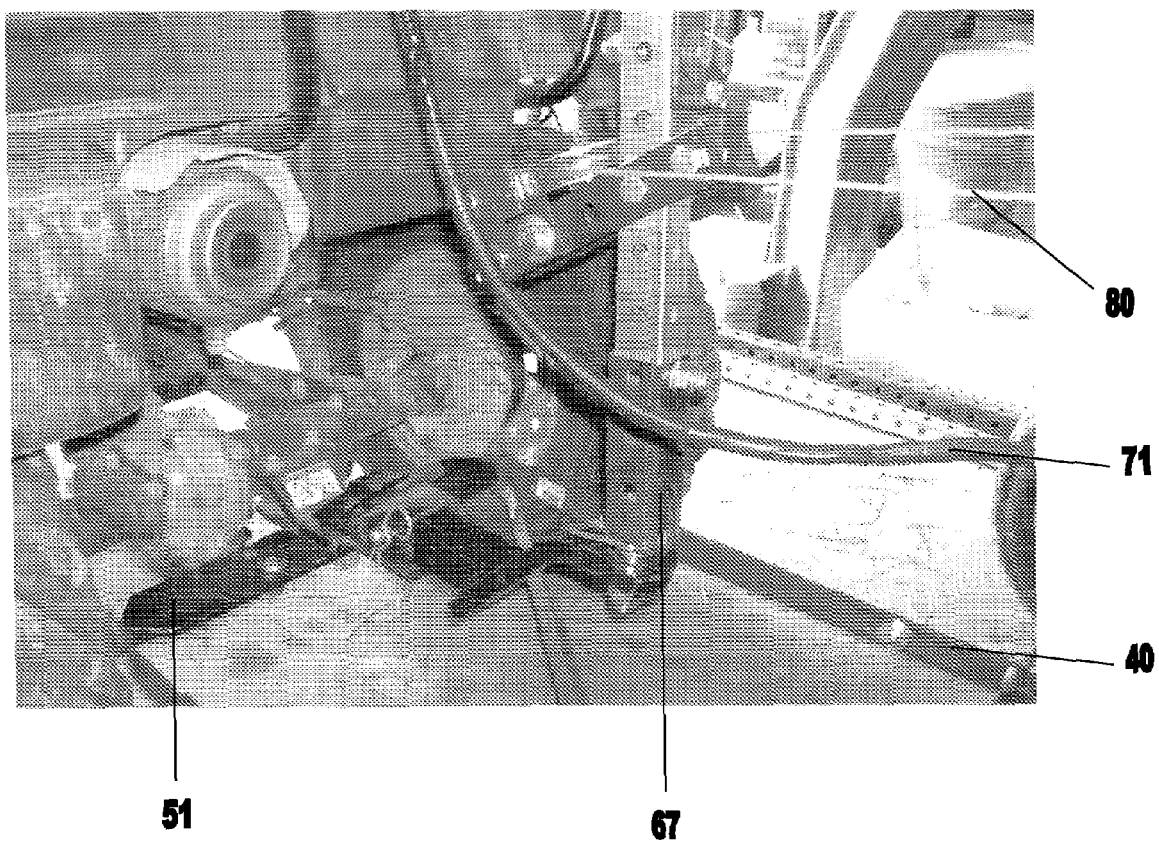
FIG. 8 is an illustration of another embodiment of the vertical post system of the present invention having a ball hitch coupler.

Specific embodiments of the vertical post system 63 may vary depending on the structure of the vehicle 1. For example, a horizontal beam 64 may be used to remove the vertical post 65 of the system 63 a distance from the ball hitch 2 such that the post 65 may rise higher than the rear of the vehicle 1 and secure to the vehicle rack 4. Apertures along a length of this horizontal beam 64 allows for adjustments in the placement of the vertical post 65 in relation thereto. Alternatively, when the horizontal beam is not necessary, the vertical post 65 may be coupled to the ball hitch 2 by means of a ball hitch extension and a ball hitch coupler 67, as shown in FIG. 8. This ball hitch coupler 67 may be configured to secure, with the aid of locking pins or other similar devices, over top of a ball hitch 2 and to the vertical post 65, thereby conjoining the two.

The vertical post system 63 may be affixed to the rack 4 of the vehicle 1 by means of one or more rack brackets 66. These rack brackets 66 are configured to secure the vertical post 65 to the vehicle rack 4 while allowing suspension movement of the vehicle 1 found in single axle vehicles. More specifically, these rack brackets 66 may be secured to the vertical post 65 in a manner that enables the brackets 66 to pivot along a vertical axis as the rack 4 rises or falls with changes in the stress placed on a vehicle's single axle suspension. The rack brackets 66 may comprise brackets, pins, nuts, and bolts, or other devices, and any combination thereof. To allow adjustment of the placement of the pulley 61B and rack bracket 66 along the vertical post 65, as may be required to accommodate different vehicle designs, the vertical post 65 may have multiple apertures along the length thereof to receive at varying heights securing means (such as bolts and nuts) for the bracket 66 and pulley 61B.

Figure 9:
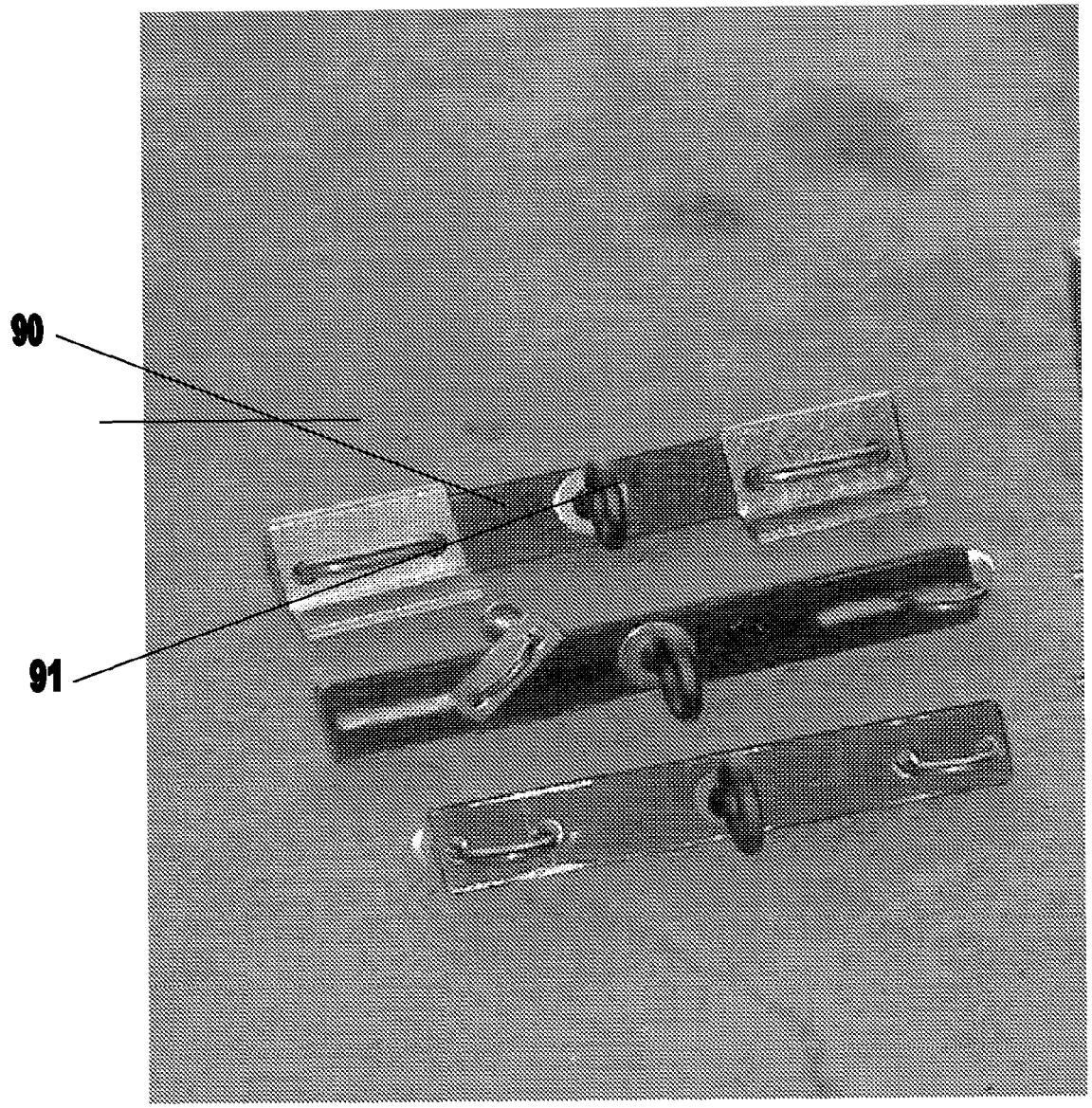
FIG. 9 is an illustration of an embodiment of a plate and eye bolt assembly of the present invention.

Alternatively, for a vehicle having an independent suspension system, the pulley system 60 comprises a plate 90, rather then vertical post system 63 described above. This plate 90, shown in FIG. 9, comprises a plurality of apertures and is secured to the rear frame of the vehicle 1 through at least one of these apertures with any of the aforementioned securing means, preferably in a position above the hitching extension 3 but below the top rear of the vehicle 1. This position of the plate 90 provides greater stabilization to the hay bale suspension system 10 when tilting and transporting a hay bale 100. An eye bolt 91 or other similar device may be secured to the plate 90 to receive a snap hook or other securing device coupled to the second pulley 61B such that the second pulley 61B is bound to the plate 90.

The winch 70 of the pulley system 60, an embodiment of which is shown in FIG. 5, may be secured to the hay spear system 20 by means of an L-shaped plate 73. The out-facing surface of the plate 73 is secured to both the base support 23 and the vertical support 22 of the hay spear system 20 such that a top of this out-facing surface may support and be secured to the winch 70.

While a manually operated winch may be used, your inventors prefer to use a powered winch 70 having a torque of at least 2,000 pounds. The winch can easily be powered by the battery of the vehicle 1. Preferably, the electrical connection 71 of the winch 70 is positioned such that the connection 71 is not damaged, pinched, or otherwise compromised by the operation of the hay bale suspension system 10. This positioning of the electrical connection 71, which may be bound by a flexible plastic tube to provide further protection, may be provided by a wire support 74 that is secured to the vertical support 22 of the hay spear system 20. The wire support 74 comprises an aperture through which the electrical connection 71 may pass before traveling to the battery. This electrical connection 71 may be interrupted by a power switch 72 that controls the electrical output from the battery to the winch 70. By way of example only, the winch 70 may be connected by a Quick-Connect power supply and, having its core rotation controlled by an in/out remote controller.

The cable 80 of the pulley system 60 generally is configured such that one end of the cable 80 is secured to and partially wound around the winch 70, while a second end of the cable 80, after passing about the pulleys 61A and 61B of the pulley system 60, is secured to the vertical support 22 of the hay spear system 20 via a snap hook or other securing device. The winch 70 may then be used to wind additional cable around its core, thereby causing the hay spear system 20 to tilt along a vertical axis of rotation established by the axle 30 of the system 20. Similarly, the winch 70 may be used to unwind the cable 80, causing the hay spear system 20 to tilt along this vertical axis back toward the ground surface.

It is contemplated by the present invention that the vehicle 1 to which the hay bale suspension system 10 may be applied need not necessarily be an all-terrain vehicle. Rather, the vehicle 1 may be a tractor, truck, automobile, or any other similarly functioning device having a hitching device extending from the vehicle 1. Use of the present invention with such alternative vehicles, however, may result in substantially more hitch weight and be more dependent on the countervailing weight of such vehicle. It is further contemplated by the present invention that equipment that may be secured to a vehicle 1 through the hitching apparatus 50 of the present invention is not limited to the hay bale suspension system 10. Rather, equipment, such as, but not limited to, a rack, may be non-pivotally connected by the hitching apparatus 50 to a vehicle 1.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A hay bale suspension system for use with a ball hitch of an all terrain vehicle, the hay bale suspension system comprising a hitch bar, a base support, a vertical support, a spike, a pulley system, and two connecting arms, wherein:

the hitch bar secures perpendicularly and non-pivotally to a bottom plate of the ball hitch;

the hitch bar comprises a centrally disposed aperture, two bar clamps, and two pins extending from two ends of the hitch bar;

the aperture of the hitch bar aligns with an aperture in the bottom plate of the ball hitch and a bolt of a ball of the ball hitch such that the aperture of the hitch bar receives the bolt of the ball of the ball hitch passing through the aperture in the bottom plate of the ball hitch and such that the hitch bar is perpendicular to the ball hitch when secured thereto;

the bar clamps of the hitch bar clamp against the bottom plate of the ball hitch such that the hitch bar does not pivot about the ball hitch when secured thereto;

the base support supports the vertical support above a ground surface and comprises base plates at terminal sides of the base support, wherein the base support further comprises ground engaging wheels attached thereto for rolling engagement by device with the ground;

the spike extends perpendicularly from the vertical support such that the spike is parallel with the base support;

the pulley system comprises a plurality of pulleys, a winch, a cable, and a vertical post system;

the vertical post system comprises a vertical post configured to secure directly over the ball of the ball hitch of the all terrain vehicle;

a first one of the plurality of pulleys and the winch are secured to the vertical support and a second one of the plurality of pulleys is secured to the vertical post of the vertical post system;

the pulley system winds and unwinds the cable with the winch about the plurality of pulleys so as to adjust bi-directionally a tilt of the vertical support and the spike such that the spike may raise and lower a hay bale with respect to the ground surface; and the connecting arms comprise apertures at respective terminal ends, the apertured terminal ends of the connecting arms couple with the base plates of the base support and with the pins of the hitch bar such that the base support secures non-pivotally to the ball hitch of the all terrain vehicle.

2. The hay bale suspension system of claim 1, wherein the pulley affixed to the vertical support comprises a pulley protection assembly that protects a rotation of the pulley from interference for a hay bale supported by the hay bale suspension system.

3. The hay bale suspension system of claim 1, wherein the vertical post of the vertical post system comprises a plurality of apertures disposed along a vertical axis of at least a portion of the vertical post so as to permit variable positioning of the second of the pulleys secured to the vertical post via one or more of the apertures.

4. The hay bale suspension system of claim 1, wherein the vertical post system further comprises a horizontal post that receives an end of the vertical post that secures directly over the ball of the ball hitch of the all terrain vehicle.

5. The hay bale suspension system of claim 1, wherein with the winding of the cable by the winch, the pulley system tilts the vertical support, the spike, and a hay bale supported thereon such that the hay bale is aligned over the base support, the axle, and the wheels such that a substantial weight of the hay bale is borne by the base support, the axle, and the wheels, rather than the pulley system or the all terrain vehicle.

6. The hay bale suspension system of claim 1, wherein the winch comprises:
   an electrical connection that connects to a battery of the all terrain vehicle, and
   a power switch that controls electrical output from the battery to the winch through the electrical connection.

7. The hay bale suspension system of claim 1, wherein each of the connecting arms comprises two or more partially overlapping bars that allow respective lengths of the connecting arms to adjust.

8. The hay bale suspension system of claim 1, wherein the hay bale suspension system further comprises at least one restrictive arm coupled at terminal ends thereof to the connecting arms so as to maintain a parallel relationship between the connecting arms.

9. The hay bale suspension system of claim 1, wherein the hay bale suspension system further comprises at least one restrictive arm secured at one terminal end to the hitch bar near one end of a first of the connecting arms and secured at another terminal end to one of the base plates of the base support near an opposite end of a second of the connecting arms so as to maintain a parallel relationship between the connecting arms.

10. A hay bale suspension system for use with a ball hitch of a vehicle, the hay bale suspension system comprising a hitch bar, a base support, a vertical support, a spike, an axle, wheels, a pulley system, two connecting arms, and at least one restrictive arm, wherein:
   the hitch bar secures perpendicularly and non-pivotally to a bottom plate of the ball hitch;
   the hitch bar comprises a centrally disposed aperture, two bar clamps, and two pins extending from two ends of the hitch bar;
   the aperture of the hitch bar aligns with an aperture in the bottom plate of the ball hitch and a bolt of a ball of the ball hitch such that the aperture of the hitch bar receives the bolt of the ball of the ball hitch passing through the aperture in the bottom plate of the ball hitch and such that the hitch bar is perpendicular to the ball hitch when secured thereto;
   the bar clamps of the hitch bar clamp against the bottom plate of the ball hitch such that the hitch bar does not pivot about the ball hitch when secured thereto;
   the base support supports the vertical support above a ground surface and comprises base plates at terminal sides of the base support;
   the spike extends perpendicularly from the vertical support such that the spike is parallel with the base support;
   the axle is coupled to the base support at the base plates and the wheels are secured to ends of the axle such that the axle and the wheels provide a stable suspension for the hay bale suspension system;
   the pulley system comprises a plurality of pulleys, a winch, a cable, and a vertical post system;
   the vertical post system comprises a vertical post configured to secure directly over the ball hitch of the vehicle;
   a first one of the plurality of pulleys and the winch are secured to the vertical support and a second one of the plurality of pulleys is secured to the vertical post of the vertical post system;
   the pulley system winds and unwinds the cable with the winch about the plurality of pulleys so as to adjust bi-directionally a tilt of the vertical support and the spike such that the spike may raise and lower a hay bale with respect to the ground surface; and
   the connecting arms comprise apertures at respective terminal ends, the apertured terminal ends of the connecting arms couple with the base plates of the base support and with the pins of the hitch bar such that the base support secures non-pivotally to the ball hitch of the vehicle; and
   the restrictive arm couples at terminal ends thereof to the connecting arms so as to maintain a parallel relationship between the connecting arms.

11. The hay bale suspension system of claim 10, wherein the vertical post of the vertical post system comprises a plurality of apertures disposed along a vertical axis of at least a portion of the vertical post so as to permit variable positioning of the second of the pulleys secured to the vertical post via one or more of the apertures.

12. The hay bale suspension system of claim 10, wherein each of the connecting arms comprises two or more partially overlapping bars that allow respective lengths of the connecting arms to adjust.

13. A hay bale suspension system for use with a ball hitch of an all terrain vehicle, the hay bale suspension system comprising a support system, a pulley system, and means for coupling the support system to the ball hitch of the all terrain vehicle, wherein:
   the support system comprises a base support, a vertical support, an axle, two or more wheels, and a spike;
   the base support supports the vertical support above a ground surface and comprises base plates at terminal sides of the base support;
   the spike extends perpendicularly from the vertical support such that the spike is parallel with the base support;

the axle is coupled to the base support at the base plates and the wheels are secured to ends of the axle such that the axle and the wheels provide a stable suspension for the support system;

the pulley system comprises a plurality of pulleys, a winch, a cable, and a vertical post system;

the vertical post system comprises a vertical post and a horizontal post that receives an end of the vertical post and secures directly over a ball of the ball hitch of the all terrain vehicle;

a first one of the plurality of pulleys and the winch are secured to the vertical support and a second one of the plurality of pulleys is secured to the vertical post of the vertical post system;

the pulley system winds and unwinds the cable with the winch about the plurality of pulleys so as to adjust bi-directionally a tilt of the vertical support and the spike such that the spike may raise and lower a hay bale with respect to the ground surface;

the coupling means comprise a hitch bar, two connecting arms, and a restrictive arm; the hitch bar secures perpendicularly and non-pivotally to a bottom plate of the ball hitch;

the hitch bar comprises a centrally disposed aperture, two bar clamps, and two pins extending from two ends of the hitch bar;

the aperture of the hitch bar aligns with an aperture in the bottom plate of the ball hitch and a bolt of the ball of the ball hitch such that the aperture of the hitch bar receives the bolt of the ball of the ball hitch passing through the aperture in the bottom plate of the ball hitch and such that the hitch bar is perpendicular to the ball hitch when secured thereto;

the bar clamps of the hitch bar clamp against the bottom plate of the ball hitch such that the hitch bar does not pivot about the ball hitch when secured thereto;

the connecting arms comprise apertures at respective terminal ends, the apertured terminal ends of the connecting arms couple with the base plates of the base support and with the pins of the hitch bar such that the base support secures non-pivotally to the ball hitch of the all terrain vehicle; and the restrictive arm couples at terminal ends thereof to the connecting arms so as to maintain a parallel relationship between the connecting arms.

\* \* \* \* \*